(12) United States Patent
Gandhi et al.

(10) Patent No.: US 7,485,273 B2
(45) Date of Patent: Feb. 3, 2009

(54) METHOD FOR THE REDUCTION OF $NO_x$ AND $NH_3$ EMISSIONS

(75) Inventors: Haren S. Gandhi, West Bloomfield, MI (US); John Vito Cavataio, Dearborn, MI (US); Robert Henry Hammerle, Franklin, MI (US); Yisun Cheng, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 89 days.

(21) Appl. No.: 11/684,064

(22) Filed: Mar. 9, 2007

(65) Prior Publication Data

US 2007/0157608 A1 Jul. 12, 2007

Related U.S. Application Data

(62) Division of application No. 10/065,470, filed on Oct. 22, 2002, now Pat. No. 7,332,135.

(51) Int. Cl.
  *B01D 53/56* (2006.01)
  *B01D 53/92* (2006.01)
  *B01D 53/94* (2006.01)
  *F01N 3/08* (2006.01)
  *F01N 3/10* (2006.01)

(52) U.S. Cl. .............. 423/213.2; 423/213.5; 423/213.7; 423/239.1; 60/274; 60/282; 60/299; 60/302

(58) Field of Classification Search .............. 423/213.2, 423/213.5, 213.7, 239.1; 422/170, 171, 177, 422/180; 60/274, 282, 299, 302
See application file for complete search history.

(56) References Cited

U.S. PATENT DOCUMENTS

| | | | |
|---|---|---|---|
| 3,767,764 A | 10/1973 | Dolbear | |
| 5,041,270 A | 8/1991 | Fujitani et al. | |
| 5,461,857 A | 10/1995 | Itou et al. | |
| 5,471,836 A | 12/1995 | Takeshima et al. | |
| 5,473,887 A | 12/1995 | Takeshima et al. | |
| 5,499,501 A | 3/1996 | Kato et al. | |
| 5,551,231 A | 9/1996 | Tanaka et al. | |
| 5,782,087 A | 7/1998 | Kinugasa et al. | |
| 5,964,088 A | 10/1999 | Kinugasa et al. | |
| 5,974,793 A | 11/1999 | Kinugasa et al. | |
| 6,047,542 A | 4/2000 | Kinugasa et al. | |
| 6,052,989 A | 4/2000 | McCabe et al. | |

(Continued)

FOREIGN PATENT DOCUMENTS

DE 019949046 A1 5/2001

(Continued)

*Primary Examiner*—Timothy C Vanoy
(74) *Attorney, Agent, or Firm*—Damian Porcari; Brooks Kushman P.C.

(57) ABSTRACT

This catalyst system simultaneously removes ammonia and enhances net $NO_x$ conversion by placing an $NH_3$—SCR catalyst formulation downstream of a lean $NO_x$ trap. By doing so, the $NH_3$—SCR catalyst adsorbs the ammonia from the upstream lean $NO_x$ trap generated during the rich pulses. The stored ammonia then reacts with the $NO_x$ emitted from the upstream lean $NO_x$ trap—enhancing the net $NO_x$ conversion rate significantly, while depleting the stored ammonia. By combining the lean $NO_x$ trap with the $NH_3$—SCR catalyst, the system allows for the reduction or elimination of $NH_3$ and $NO_x$ slip, reduction in $NO_x$ spikes and thus an improved net $NO_x$ conversion during lean and rich operation.

2 Claims, 7 Drawing Sheets

U.S. PATENT DOCUMENTS

| | | |
|---|---|---|
| 6,069,013 A | 5/2000 | Plog et al. |
| 6,109,024 A | 8/2000 | Kinugasa et al. |
| 6,119,452 A | 9/2000 | Kinugasa et al. |
| 6,133,185 A | 10/2000 | Kinugasa et al. |
| 6,176,079 B1 | 1/2001 | Konrad et al. |
| 6,221,804 B1 | 4/2001 | Yamada et al. |
| 6,230,485 B1 | 5/2001 | Kisenyi |
| 6,276,132 B1 | 8/2001 | Kanesaka et al. |
| 6,301,878 B1 | 10/2001 | Zhang et al. |
| 6,338,244 B1 | 1/2002 | Guenther et al. |
| 6,345,496 B1 | 2/2002 | Fuwa et al. |
| 6,672,051 B2 | 1/2004 | Tamura et al. |
| 6,725,647 B2 | 4/2004 | Pfeifer et al. |
| 6,753,294 B1 | 6/2004 | Brisley et al. |
| 6,766,642 B2 | 7/2004 | Binder et al. |
| 6,820,415 B2 | 11/2004 | Abet et al. |
| 6,826,906 B2 | 12/2004 | Kakwani et al. |
| 7,052,532 B1 | 5/2006 | Liu et al. |
| 7,062,904 B1 | 6/2006 | Hu et al. |
| 7,211,226 B2 | 5/2007 | Liu et al. |
| 7,225,613 B2 | 6/2007 | Hammerle et al. |
| 2005/0129601 A1 | 6/2005 | Li et al. |
| 2006/0140833 A1 | 6/2006 | Morita et al. |
| 2008/0159936 A1* | 7/2008 | Zones et al. ............. 423/213.5 |

FOREIGN PATENT DOCUMENTS

| | | |
|---|---|---|
| EP | 0723805 B1 | 1/1996 |
| EP | 0773354 B1 | 5/1997 |
| EP | 0878609 B1 | 5/1998 |
| EP | 1027919 A2 | 8/2000 |
| EP | 1213460 B1 | 12/2001 |
| JP | 11030117 A | 2/1999 |
| JP | 2002-153755 | 11/2000 |
| JP | 2001-140630 | 5/2001 |
| JP | 2002-242667 | 8/2002 |

* cited by examiner

T = 250C
L = 50s, 5s rich

T = 250C
L = 50s, 5s rich

T = 250C
L = 50s, 5s rich

METHOD FOR THE REDUCTION OF $NO_x$ AND $NH_3$ EMISSIONS

CROSS-REFERENCE TO RELATED APPLICATIONS

This application is a division of U.S. application Ser. No. 10/065,470, filed Oct. 22, 2002, which has issued as U.S. Pat. No. 7,332,135.

BACKGROUND OF THE INVENTION

1. Field of the Invention

The present invention is directed to a catalyst system to facilitate the reduction of nitrogen oxides ($NO_x$) and ammonia from an exhaust gas. More particularly, the catalyst system of this invention includes a lean $NO_x$ trap in combination with an ammonia selective catalytic reduction ($NH_3$—SCR) catalyst, which stores the ammonia formed in the lean $NO_x$ trap during rich air/fuel operation and then reacts the stored ammonia with nitrogen oxides to improve $NO_x$ conversion to nitrogen when the engine is operated under lean air/fuel ratios. In an alternate embodiment, a three-way catalyst is designed to produce desirable $NH_3$ emissions at stoichiometric conditions and thus reduce $NO_x$ and $NH_3$ emissions.

2. Background Art

Catalysts have long been used in the exhaust systems of automotive vehicles to convert carbon monoxide, hydrocarbons, and nitrogen oxides ($NO_x$) produced during engine operation into non-polluting gases such as carbon dioxide, water and nitrogen. As a result of increasingly stringent fuel economy and emissions standards for car and truck applications, it is preferable to operate an engine under lean conditions to improve vehicle fuel efficiency and lower $CO_2$ emissions. Lean conditions have air/fuel ratios greater than the stoichiometric ratio (an air/fuel ratio of 14.6), typically air/fuel ratios greater than 15. While lean operation improves fuel economy, operating under lean conditions increases the difficulty in treating some polluting gases, especially $NO_x$.

Regarding $NO_x$ reduction for diesel and lean burn gasoline engines in particular, lean $NO_x$ adsorber (trap) technologies have been widely used to reduce exhaust gas $NO_x$ emissions. Lean $NO_x$ adsorbers operate in a cyclic fashion of lean and rich durations. The lean $NO_x$ trap functions by adsorbing $NO_x$ when the engine is running under lean conditions—until the $NO_x$ trap reaches the effective storage limit—followed by $NO_x$ reduction when the engine is running under rich conditions. Alternatively, $NO_x$ reduction can proceed by simply injecting into the exhaust a sufficient amount of reductant that is independent of the engine operation. During this rich cycle, a short rich pulse of reductants, carbon monoxide, hydrogen and hydrocarbons reduces the $NO_x$ adsorbed by the trap during the lean cycle. The reduction caused during the rich cycle purges the lean $NO_x$ adsorber, and the lean $NO_x$ adsorber is then immediately available for the next lean $NO_x$ storage/rich $NO_x$ reduction cycle. In general, poor $NO_x$ reduction is observed if the air excess ratio λ is above 1. $NO_x$ reduction generally increases over lean $NO_x$ adsorbers as the λ ratio is decreased lower than 1. This air excess or lambda ratio is defined as the actual air/fuel ratio divided by the stoichiometric air/fuel ratio of the fuel used. The use of lean $NO_x$ adsorber (trap) technology, and in particular the rich pulse of reductants, can cause the λ ratio to reach well below 1.

Lean $NO_x$ traps, however, often have the problem of low $NO_x$ conversion; that is, a high percentage of the $NO_x$ slips through the trap as $NO_x$. $NO_x$ slip can occur either during the lean portion of the cycle or during the rich portion. The lean $NO_x$ slip is often called "$NO_x$ breakthrough". It occurs during extended lean operation and is related to saturation of the $NO_x$ trap capacity. The rich $NO_x$ slip is often called a "$NO_x$ spike". It occurs during the short period in which the $NO_x$ trap transitions from lean to rich and is related to the release of stored $NO_x$ without reduction. Test results depicted in FIG. 1a have shown that during this lean-rich transition, $NO_x$ spikes, the large peaks of unreacted $NO_x$, accounts for approximately 73% of the total $NO_x$ emitted during the operation of a lean $NO_x$ trap. $NO_x$ breakthrough accounts for the remaining 27% of the $NO_x$ emitted.

An additional problem with lean $NO_x$ traps arises as a result of the generation of ammonia by the lean $NO_x$ trap. As depicted in FIG. 1b, ammonia is emitted into the atmosphere during rich pulses of the lean $NO_x$ adsorber. In laboratory reactor experiments, ammonia spikes as high as 600 ppm have been observed under typical lean $NO_x$ adsorber operation (see FIG. 1b). While ammonia is currently not regulated, ammonia emissions are being closely monitored by the U.S. Environmental Protection Agency; and, therefore, reduction efforts must be underway. Ammonia is created when hydrogen or hydrogen bound to hydrocarbons reacts with $NO_x$ over a precious metal, such as platinum. The potential for ammonia generation increases for a precious metal catalyst (such as a lean $NO_x$ trap) as the λ ratio is decreased, as the duration of the rich pulse increases, and the temperature is decreased. There is thus an optimum lambda and rich pulse duration where the maximum $NO_x$ reduction is observed without producing ammonia. Attempts to enhance conversion of $NO_x$ by decreasing the λ ratio of the rich pulse duration leads to significant production of ammonia and thus results in high gross $NO_x$ conversion ($NO_x \rightarrow N_2 + NH_3$), but much lower net $NO_x$ conversion ($NO_x \rightarrow N_2$).

In addition to nitrogen, a desirable non-polluting gas, and the undesirable $NH_3$ described above, $N_2O$ is another $NO_x$ reduction products. Like $NH_3$, $N_2O$ is generated over $NO_x$ adsorbers and emitted into the atmosphere during rich pulses. The gross $NO_x$ conversion is the percent of $NO_x$ that is reduced to $N_2$, $N_2O$ and $NH_3$. The net $NO_x$ conversion is the percent of $NO_x$ that is reduced to nitrogen, $N_2$, only. Accordingly, the gross $NO_x$ conversion is equal to the net $NO_x$ conversion if nitrogen is the only reaction product. However, the net $NO_x$ conversion is almost always lower than the gross $NO_x$ conversion. Accordingly, a high gross $NO_x$ conversion does not completely correlate with the high portion of $NO_x$ that is reduced to nitrogen.

The $NO_x$ conversion problem is magnified for diesel vehicles, which require more than a 90% $NO_x$ conversion rate under the 2007 U.S. Tier II BIN 5 emissions standards at temperatures as low as 200° C. While high $NO_x$ activity is possible at 200° C., it requires extreme measures such as shortening the lean time, lengthening the rich purge time, and invoking very rich air/fuel ratios. All three of these measures, however, result in the increased formation of $NH_3$ or ammonia. Accordingly, while it may be possible to achieve 90+% gross $NO_x$ conversion at 200° C., to date there has not been a viable solution to achieve 90+% net $NO_x$ conversion.

Accordingly, a need exists for a catalyst system that eliminates $NO_x$ breakthrough during the lean operation as well has the $NO_x$ spikes during the lean-rich transition period. There is also a need for a catalyst system that is capable of improving net $NO_x$ conversion. Finally, there is a need for a catalyst system capable of reducing ammonia emissions.

SUMMARY OF THE INVENTION

This invention provides a solution for all of the above problems and, in particular, reduces or eliminates ammonia emissions and improves the net $NO_x$ conversion of the catalyst system. These problems are solved by simultaneously removing ammonia and enhancing $NO_x$ conversion with the use of an $NH_3$—SCR catalyst placed downstream of the lean $NO_x$ adsorber catalyst, as shown in FIG. 2. The $NH_3$—SCR catalyst system serves to adsorb the ammonia emissions from the upstream lean $NO_x$ adsorber catalyst generated during the rich pulses. Accordingly, as shown in FIG. 2, the ammonia emissions produced by the lean $NO_x$ adsorber is stored and effectively controlled by the $NH_3$—SCR catalyst rather than being emitted. This reservoir of adsorbed ammonia then reacts directly with the $NO_x$ emitted from the upstream lean $NO_x$ adsorber. As a result, as shown in FIG. 3, the overall net $NO_x$ conversion is enhanced from 55% to 80%, while depleting the stored ammonia, as a function of the SCR reaction: $NH_3 + NO_x \rightarrow N_2$. The $NH_3$—SCR catalyst is then replenished with ammonia by subsequent rich pulses over the lean $NO_x$ adsorber.

During the lean cycle for this lean $NO_x$ adsorber+$NH_3$—SCR system, the $NO_x$ breakthrough from the upstream lean $NO_x$ adsorber is reduced continuously as it passes over the $NH_3$—SCR until the reservoir of ammonia is depleted. In addition, during the rich cycle, large spikes of unreacted $NO_x$ are created. The downstream $NH_3$—SCR catalyst thus serves to dampen these large $NO_x$ spikes by reacting the unreacted $NO_x$, with the reservoir of stored ammonia emitted from the lean $NO_x$ adsorber. In general, the combination of the lean $NO_x$ adsorber+$NH_3$—SCR catalyst system allows for the reduction, or elimination, of ammonia emissions and $NO_x$ slip, i.e., reduction of $NO_x$ breakthrough and $NO_x$ spikes and, therefore, improved net $NO_x$ conversion during lean and rich operation.

Additionally, under this invention, urea and/or ammonia does not need to be injected into the exhaust system to effectuate the reaction between $NO_x$ and ammonia. Rather, the ammonia is automatically generated from the $NO_x$ present in the exhaust gas as it passes over the precious metal lean $NO_x$ adsorber during the rich pulses. The generated ammonia is then stored on the downstream $NH_3$—SCR catalyst, to react with the unreacted $NO_x$, and thereby convert the unreacted $NO_x$ to nitrogen.

The $NH_3$—SCR catalyst thus serves to adsorb the ammonia from the upstream lean $NO_x$ adsorber catalyst generated during the rich pulses. Under this system, the ammonia is stored and effectively controlled rather than being emitted. This reservoir of adsorbed ammonia then reacts directly with any $NO_x$ emitted from the upstream lean $NO_x$ adsorber. As a result, the overall net $NO_x$ conversion is enhanced from 55% to 80%, while the overall gross $NO_x$ conversion is enhanced from 68% to 82%, as shown in FIG. 3.

In one alternative embodiment of this invention, the catalyst system can be optimized and $NO_x$ reduction increased by vertically slicing the lean $NO_x$ trap and $NH_3$—SCR catalyst substrates to create separate catalyst zones, such that the catalytic converter shell or can would have alternating sections of lean $NO_x$ trap and $NH_3$—SCR catalysts, as shown in FIGS. 4a, 4b and 4c. Under this embodiment, both technologies, the lean $NO_x$ trap formulation and the $NH_3$—SCR formulation, can be incorporated into a single substrate and/or a single converter can rather than placing the $NH_3$—SCR catalyst downstream of the lean $NO_x$ adsorber as two separate and distinct catalyst substrates.

DETAILED DESCRIPTION OF THE PREFERRED EMBODIMENT(S)

In this invention, net $NO_x$ conversion is improved and ammonia emissions reduced through the use of a lean $NO_x$ trap and $NH_3$—SCR catalyst system which operate together to produce and store ammonia and reduce $NO_x$ to nitrogen. In so doing, the catalyst system of the present invention solves three problems of lean $NO_x$ traps; namely, reducing $NO_x$ breakthrough, $NO_x$ spikes and ammonia emissions.

In order to meet increasingly stringent fuel economy standards, it is preferable to operate an automotive engine under lean conditions. However, while there is improvement in fuel economy, operating under lean conditions has increased the difficulty in reducing $NO_x$ emissions. As an example, for a traditional three-way catalyst, if the air/fuel ratio is lean even by a small amount, $NO_x$ conversion drops to low levels. With traditional three-way catalysts, the air/fuel ratio must be controlled carefully at stoichiometric conditions to maximize reduction of hydrocarbons, carbon monoxide and $NO_x$.

Throughout this specification, $NO_x$ refers to nitrogen oxides, which include nitrogen monoxide NO and nitrogen dioxide $NO_2$. Further, lean $NO_x$ adsorber and lean $NO_x$ trap are used interchangeably throughout this specification.

To achieve $NO_x$ reduction, under lean operating conditions, one option is the inclusion of a lean $NO_x$ trap. While the lean $NO_x$ trap is generally effective in $NO_x$ reduction, lean $NO_x$ traps are known to have the problems referred to as "$NO_x$ slip" which includes breakthrough of $NO_x$ during the extended lean operation of the $NO_x$ trap and also $NO_x$ spikes generated during the transition from the lean to the rich cycle.

NO$_x$ spikes, or NO$_x$ emissions during the lean-rich transition, are believed to occur due to the exothermic heat generated from the oxidation of reductants, carbon monoxide, hydrocarbons and hydrogen, by the oxygen released from the oxygen storage material—the temperature rise can be as high as 80-100° C.

Figure 1A:
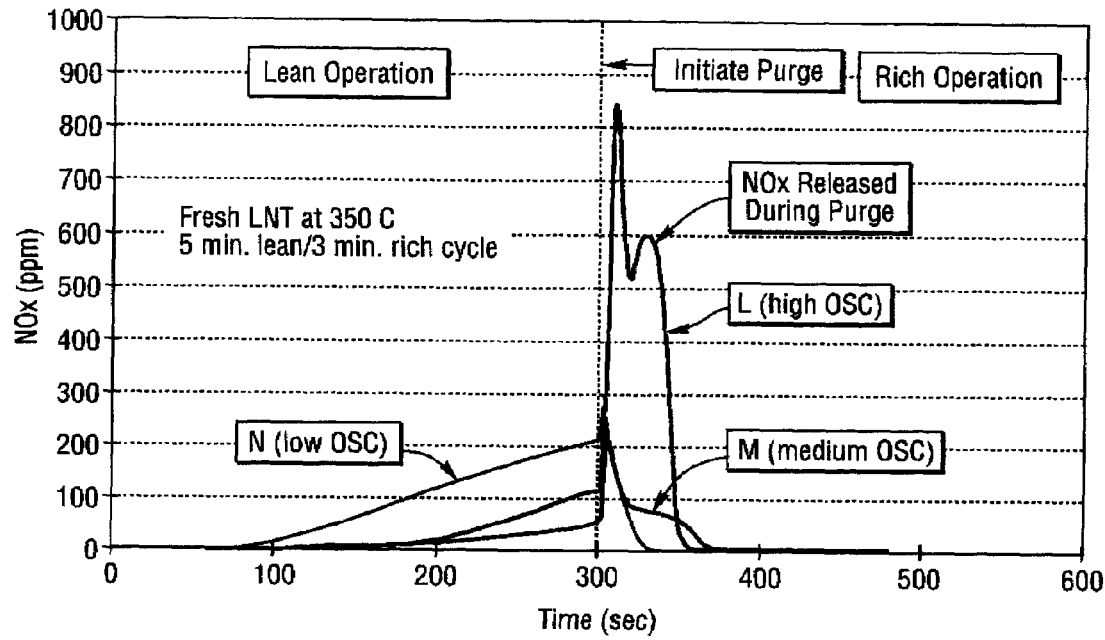
FIG. 1a is a graph illustrating the $NO_x$ spikes that occur during the $NO_x$ trap lean-rich transition.
Figure 1B:
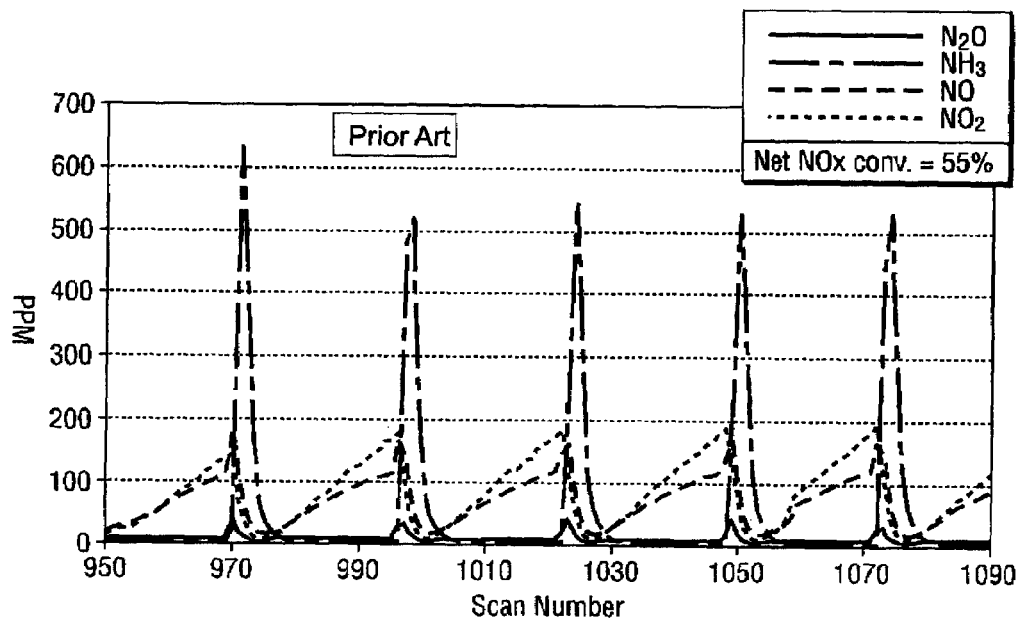
FIG. 1b is a graph illustrating $NO_x$ and $NH_3$ emissions from a typical prior art lean $NO_x$ adsorber system.

The problem of NO$_x$ spikes is illustrated in FIG. 1a, and the problem of insufficient net NO$_x$ conversion is illustrated in FIG. 1b. FIG. 1b depicts laboratory reactor data of a lean NO$_x$ adsorber system operating in an 85 second lean and 5 second rich cyclic pattern. The plot in FIG. 1b shows the nitrogen species concentration as a function of time. The laboratory reactor data depicted in FIG. 1b resulted from a catalyst having an engine swept volume (ESV) of 100%. Additionally, the reactor used to obtain the results in FIG. 1b was at a temperature of 300° C. To begin the cycle, 500 ppm of nitrogen oxide was fed into the reactor where much of it was stored during the 85 second lean duration. During the 5 second rich duration, nitrogen oxide was reduced; however, a significant amount of ammonia was formed. As illustrated in FIG. 1b, the data shows ammonia spikes as high as 600 ppm under typical lean NO$_x$ adsorber operation. Conversion, however, is generally improved as the λ ratio is decreased during the rich pulse. Decreasing the λ ratio also leads to significant production of ammonia and thus results in high gross NO$_x$ conversion (NO$_x$→N$_2$+NH$_3$), but much lower net NO$_x$ conversion (NO$_x$→N$_2$). As illustrated in FIG. 1b, the net NO$_x$ conversion to nitrogen for this lean NO$_x$ adsorber system was only 55%.

Figure 2:
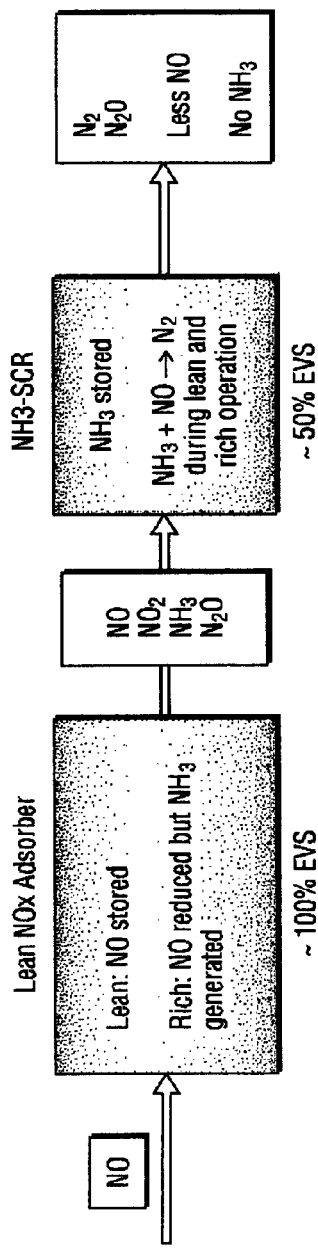
FIG. 2 depicts the lean $NO_x$ and $NH_3$—SCR catalyst system of the present invention.

Under the catalyst system of this invention, ammonia is reduced and the net NO$_x$ conversion improved simultaneously by placing an NH$_3$—SCR catalyst formulation downstream of the lean NO$_x$ adsorber catalyst, as shown in FIG. 2.

FIG. 2 is an illustration of the catalyst system of this invention, which is capable of simultaneously eliminating ammonia emissions and improving net NO$_x$ conversion. As illustrated in FIG. 2, NO$_x$ produced during engine operation is stored by the lean NO$_x$ adsorber during the lean cycle. Following the lean cycle, during the rich cycle of the lean NO$_x$ adsorber, NO$_x$ is reduced and ammonia generated. The lean NO$_x$ adsorber stores much of the NO$_x$ during the lean operation and then reduces NO$_x$ during rich pulses of the reductants. During the same rich pulses, significant amounts of ammonia are generated, as further illustrated in FIG. 1. As illustrated in FIG. 2, the lean NO$_x$ adsorber emits NO, NO$_2$, NH$_3$, and N$_2$O. These same gases then pass through the NH$_3$—SCR, where NH$_3$ is stored. Accordingly, the addition of the NH$_3$—SCR catalyst downstream allows for the adsorption of NH$_3$ and subsequent reaction with any NO$_x$ that slips through the upstream lean NO$_x$ adsorber, which thus improves the overall net NO$_x$ conversion (NH$_3$+NO→N$_2$). As can be seen in FIG. 2, the catalyst system of this invention results in a significant net NO$_x$ conversion improvement, the elimination of ammonia emissions, and the production of non-polluting gases nitrogen and N$_2$O.

It should be noted that for diesel applications, lean NO$_x$ adsorbers must operate at lower temperatures compared to gasoline lean NO$_x$ adsorbers since the exhaust temperatures of diesel engines are significantly lower. More ammonia is generated at 200° C. than at 300° C. over lean NO$_x$ adsorbers, and thus the catalyst system of this invention has an even greater potential for diesel applications. Likewise, the problem of NO$_x$ spikes is more critical at higher temperatures, the temperatures used for gasoline applications; and thus the catalyst system of this invention is beneficial to control the unreacted NO$_x$ spikes that result from the operation of a lean NO$_x$ adsorber at operating temperatures typical for gasoline lean NO$_x$ adsorber applications.

The NH$_3$—SCR catalyst thus serves to adsorb the ammonia produced naturally from the upstream lean NO$_x$ adsorber catalyst generated during the rich pulses. As a result, the NH$_3$—SCR catalyst stores the ammonia, controlling it rather than allowing it to be emitted into the atmosphere. This reservoir of adsorbed NH$_3$ in the NH$_3$—SCR catalyst reacts directly with the NO$_x$ emitted from the upstream lean NO$_x$ adsorber (trap).

In general, this invention works to clean NO$_x$ emissions—and thus has applicability for stationary sources as well as for moving vehicles. This invention may be used to reduce NO$_x$ emissions for nitric acid plants, or any other stationary source that requires the reduction of NO$_x$ emissions. This invention is nonetheless particularly directed for use with gasoline and diesel vehicles which, unlike stationary sources, have a wide range of operating parameters, especially temperature parameters—which cannot be precisely controlled. The present invention has the ability to store large quantities of ammonia across a broad temperature range to effectuate the reaction between ammonia and nitrogen oxides and thereby convert NO$_x$ to nitrogen.

Figure 3:
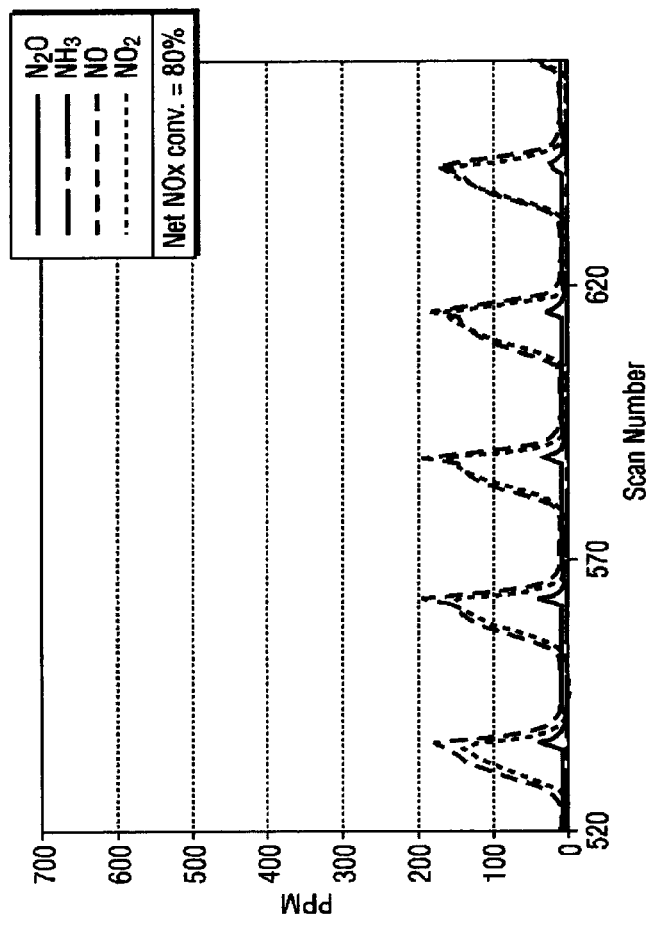
FIG. 3 depicts reduced $NO_x$ emissions and $NH_3$ emissions as a result of the use of the lean $NO_x$ and $NH_3$—SCR catalyst system of the present invention, as shown in FIG. 2.

As illustrated in FIG. 3, laboratory experiments have demonstrated that the use of a lean NO$_x$ adsorber plus NH$_3$—SCR catalyst system improves net NO$_x$ conversion from 55%, as illustrated in FIG. 1, to 80%. FIG. 3 is a graph displaying laboratory data obtained using the catalyst system of this invention, wherein NO$_x$ ppm are charted as a function of time. As illustrated in FIG. 3, the catalyst system of this invention completely eliminated the ammonia spikes created during the rich pulses of the lean NO$_x$ adsorber. In this system, ammonia is stored on the NH$_3$—SCR catalyst where it reacts with NO$_x$ during the 85 second lean duration, which thus improves the net NO$_x$ conversion from 55% to 80% with no additional fuel economy penalty. As shown in FIG. 3, the improved net NO$_x$ conversion can be observed by the much narrower profile—zero ppm NO$_x$ is emitted for a significant amount of time as compared to the graph shown in FIG. 1 of a system lacking the NH$_3$—SCR+lean NO$_x$ adsorber combination.

The reaction between the stored ammonia and NO$_x$ increases the overall net NO$_x$ conversion, which is enhanced from 55%—the amount of NO$_x$ converted in prior art lean NO$_x$ trap systems—to 80%—as a result of the combination of a lean NO$_x$ trap and NH$_3$—SCR catalyst system. Moreover, in addition to improving net NO$_x$ conversion, the ammonia stored in the NH$_3$—SCR catalyst is depleted during the SCR reaction wherein ammonia and nitrogen oxide are reacted to produce nitrogen. The NH$_3$—SCR catalyst is replenished with ammonia by subsequent rich pulses over the lean NO$_x$ adsorber that causes a portion of the NO$_x$ to react with hydrogen to form ammonia.

It should be noted that no urea or ammonia needs to be injected into the exhaust system to effectuate the reaction between ammonia and NO$_x$. Rather, the ammonia is naturally generated from the NO$_x$ present in the exhaust gas as it passes over the lean NO$_x$ trap during rich pulses. More specifically, ammonia is naturally created during the fuel rich cycle of the lean NO$_x$ trap. Ammonia is naturally produced as it passes over the precious metal active component of the lean NO$_x$ trap. Similarly, the ammonia could also be generated in a conventional precious metal based TWC located upstream of a LNT/NH$_3$—SCR system.

For this invention, the lean NO$_x$ trap is optimized for ammonia generation by removing oxygen storage capacity (OSC) and thereby enhancing the rich cycle, and thus creating a greater quantity of ammonia for reaction with the NO$_x$ in the downstream $NH_3$—SCR catalyst. In a preferred embodiment, the lean $NO_x$ trap includes platinum as the precious metal. Platinum is the preferred precious metal because it is believed that a greater quantity of $NH_3$ is produced over platinum than rhodium, palladium and/or a combination of the precious metals. Nonetheless, other precious metals such as palladium and rhodium, and the combination of one or more of the precious metals platinum, palladium and rhodium may also be used to generate $NH_3$.

Additionally, the lean $NO_x$ trap of this invention preferably includes a "$NO_x$ adsorbing material" or $NO_x$ storage component/material, which can be alkali and alkali earth metals such as barium, cesium, and/or rare earth metals such as cerium and/or a composite of cerium and zirconium. Although an alternative catalyst formulation that does not contain a $NO_x$ storage component but generates ammonia from $NO_x$ may also be utilized, in the most preferred embodiment, the $NO_x$ storage material should have the ability to store $NO_x$ at low temperature ranges, specifically in the range of 150° C.-300° C. The $NH_3$ thermodynamic equilibrium under rich conditions is maximized during the temperature range of 150° C.-300° C.

In general, to increase the $NO_x$ storage function of the lean $NO_x$ trap and effectuate the $NO_x$ conversion reaction, in the preferred embodiment, the lean $NO_x$ trap has the following characteristics: (1) the inclusion of platinum as the precious metal; (2) the ability to store $NO_x$ between 150° C. and 500° C. during the lean portion of the cycle; (3) the ability to maximize the duration of the lean $NO_x$ trap rich cycle; (4) the ability to generate ammonia at the 150° C.-500° C. temperature range; (5) minimize OSC to lessen fuel penalty; and (6) lower lambda to generate more ammonia. Ammonia production is maximized at the preferred temperature range, 150° C.-300° C.—which also correlates with the steady state equilibrium range for ammonia creation. It bears emphasis that other $NO_x$ storage components may be utilized, especially for stationary sources, where sulfur poisoning does not pose a threat.

Most simply, the $NH_3$—SCR catalyst may consist of any material or combination of materials that can adsorb ammonia and facilitate the $NO_x+NH_3$ to yield nitrogen. The $NH_3$—SCR catalyst should preferably be made of a base metal catalyst on a high surface area support such as alumina, silica, titania, zeolite or a combination of these. More preferably, the $NH_3$—SCR catalyst should be made of a base metal selected from the group consisting of Cu, Fe and Ce and/or a combination of these metals, although other base metals may be used. Base metals generally are able to effectuate $NO_x$ conversion using ammonia while both the base metals and the high surface support material serves to store $NH_3$. The base metal and high surface area support such as zeolite selected should preferably be one that can store $NH_3$ over the widest possible temperature range. Likewise, the base metal selected is preferably one that can convert NO and $NO_2$ to $N_2$ across the widest possible temperature range and the widest range of $NO/NO_2$ ratios.

The advantage of the catalyst system of this invention is the use of a combination of a lean $NO_x$ trap and an $NH_3$—SCR catalyst. The use of a lean $NO_x$ trap in the present system allows for much greater storage of $NO_x$, because the $NO_x$ breakthrough that would otherwise happen can be controlled by the $NH_3$—SCR catalyst. Additionally, the use of a lean $NO_x$ trap as part of this system allows for the operation of the engine at lean conditions for a longer time, and thus provides improved fuel economy. If, for example, a three-way catalyst is used as the $NO_x$ storage mechanism, $NO_x$ storage is significantly limited, as well as the production of ammonia. To maximize the reduction of emissions, a three-way catalyst must be operated at stoichiometric conditions. Accordingly, unless the three-way catalyst is run on the rich side 100% of the time, ammonia production is significantly less than for a typical lean $NO_x$ trap. As set forth above, the efficiency of a three-way catalyst is compromised if it is operated at conditions other than at stoichiometric conditions. Thus the combination of a lean $NO_x$ trap and $NH_3$—SCR catalyst allows for significant $NO_x$ storage and ammonia production and thus increases net $NO_x$ conversion.

In a preferred embodiment, the lean $NO_x$ trap and $NH_3$—SCR catalyst constitute alternating zones in a single substrate and/or a single catalytic converter can. This zoned design, as shown in three different embodiments in FIGS. 4a-4c, is believed to maximize the reaction between ammonia and $NO_x$.

As illustrated in FIG. 4, three zoned catalyst system embodiments were evaluated on a laboratory flow reactor. The total catalyst system dimensions were held constant at a 1" diameter and 2" length. The first system, labeled "4a", had a 1" long lean $NO_x$ trap followed by a 1" long $NH_3$—SCR catalyst. In the second system, labeled "4b", the catalyst samples were sliced in half to yield alternating ½" long sections. Finally, in the third system, labeled "4c", the same catalyst samples were further cut in half to yield ¼" long sections, again of the lean $NO_x$ trap and $NH_3$—SCR catalyst technologies. It should be noted that each time the catalysts were sliced, as shown in "4b" and "4c", the overall length of the catalyst system was reduced slightly, approximately 3/16" total. The alternating lean $NO_x$ trap and $NH_3$—SCR catalyst zones can be created in a single substrate or the lean $NO_x$ trap and $NH_3$—SCR catalyst prepared, cut as desired and then placed adjacent one another in a single can. The zones are preferably formed in a single substrate. However, cut substrates placed in alternating fashion also exhibit improved net $NO_x$ conversion.

Figure 4A:
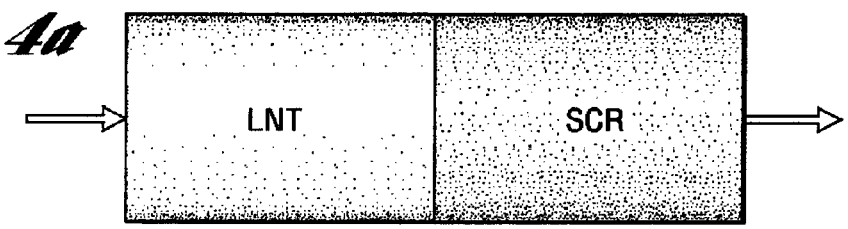
FIGS. 4a, 4b, and 4c depict three different zoned catalyst embodiments of the lean $NO_x$ and $NH_3$—SCR catalyst system.
Figure 4B:
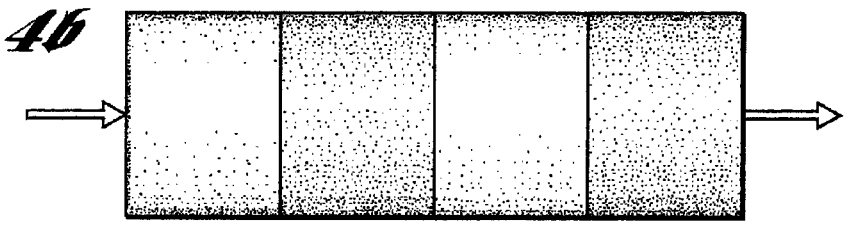
Figure 4C:
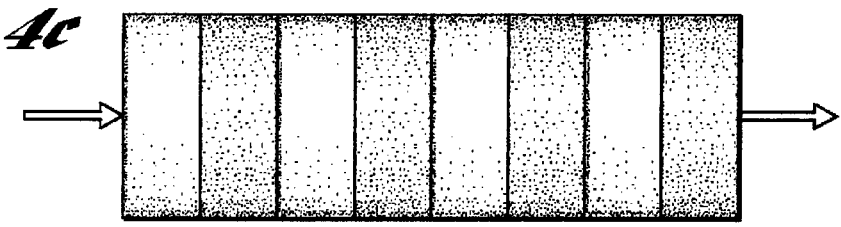

Under the zoned catalyst designs shown in FIGS. 4a-4c, where alternating lean $NO_x$ and $NH_3$—SCR catalyst zones are provided, the ammonia formed by the lean $NO_x$ trap is believed to be immediately adsorbed by the $NH_3$—SCR catalyst for use in the $NO_x$ conversion reaction. It is further believed that the greater the separation between the lean $NO_x$ trap and the $NH_3$—SCR catalyst, the greater chance there is for the ammonia to be converted back into $NO_x$. It is further believed that oxygen is more abundant in the back of a catalyst substrate and thus the oxygen may be available to effectuate the unwanted conversion of the ammonia back to nitrogen oxide. Accordingly, if the catalyst substrate is too long, there may be some undesired conversion that takes place; and thus in a preferred embodiment, the substrate is designed so that ammonia is available for immediate reaction with $NO_x$.

Figure 5A:
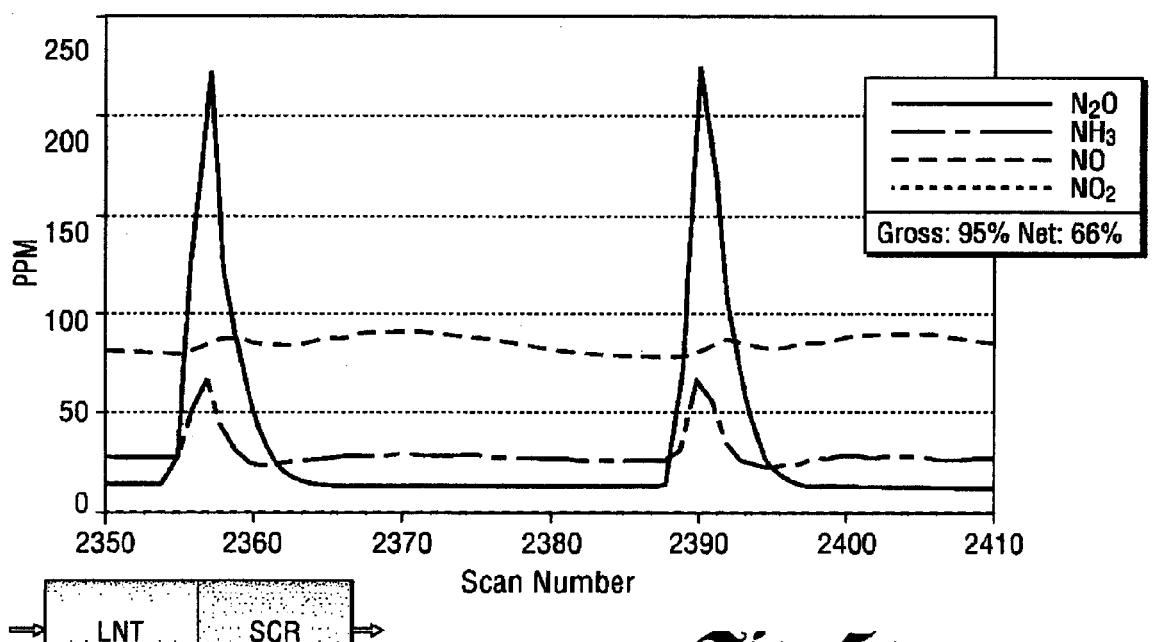
FIGS. 5a, 5b, and 5c provide graphs illustrating the reduced levels of $NO_x$ and $NH_3$ emissions resulting from each of the three zoned catalyst embodiments depicted in FIGS. 4a, 4b, and 4c at a 250° C. inlet gas temperature and operating at a 50 second lean cycle and 5 second rich cycle.
Figure 5B:
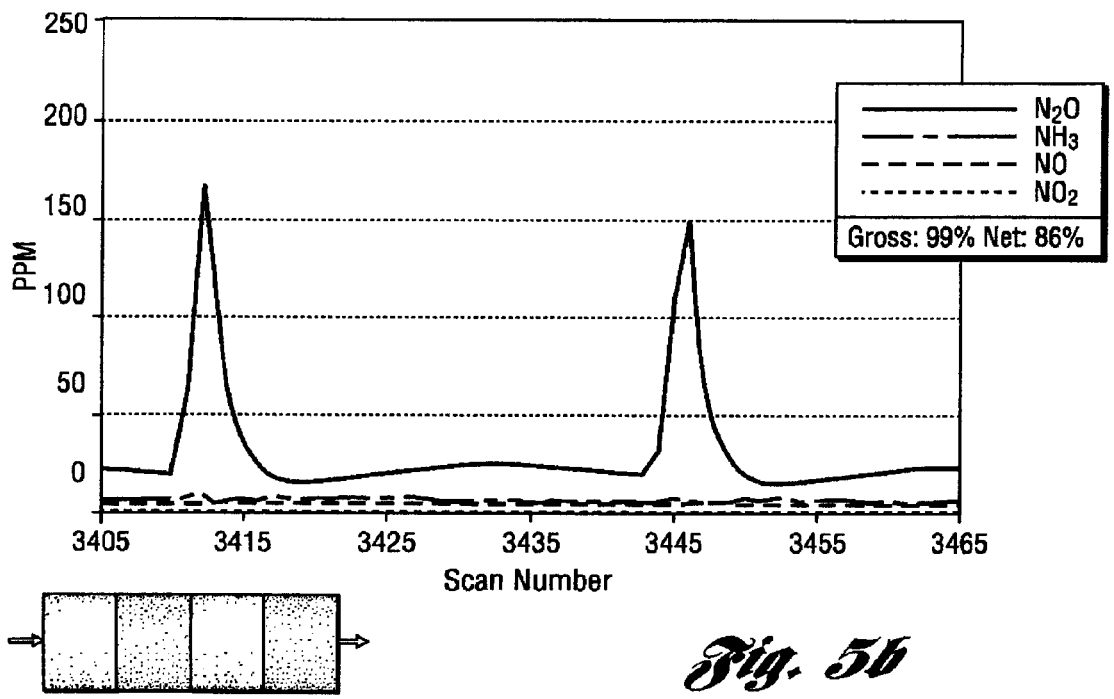
Figure 5C:
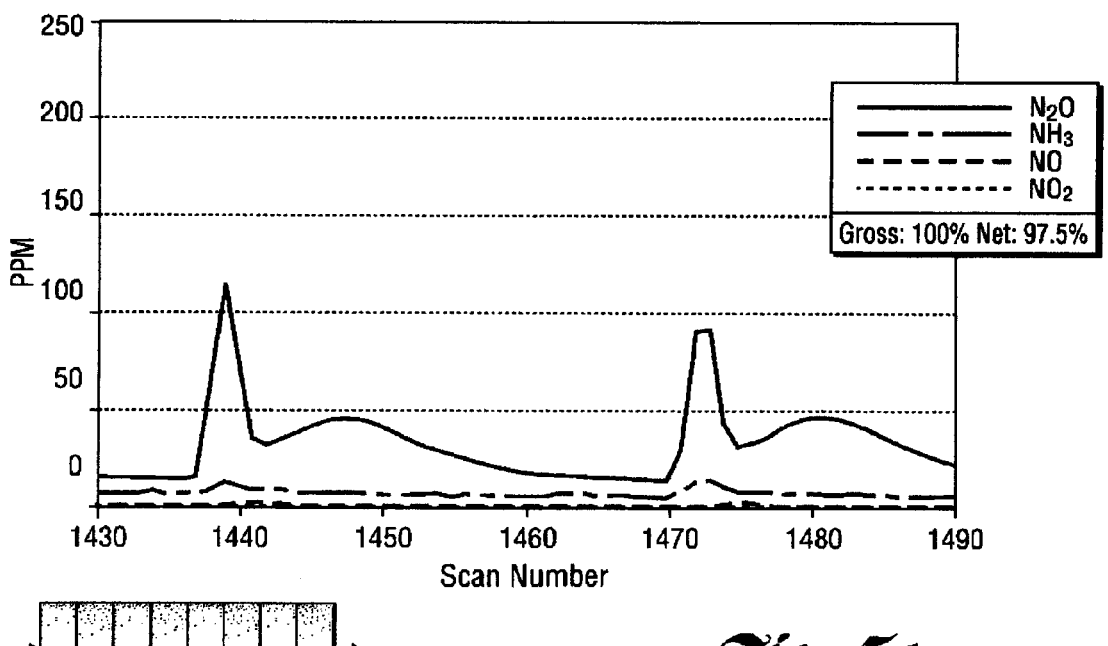

FIGS. 5a-5c illustrate laboratory reactor data of the three different zoned catalyst system embodiments shown in FIGS. 4a-4c. This laboratory data was obtained with the three catalyst systems operating at a 250° C. inlet gas temperature and operating with 50 second lean and 5 second rich cycles. Additionally, the inlet concentration of the $NO_x$ feed gas was 500 ppm and the overall space velocity was 15,000 per hour. As illustrated in FIGS. 5a-5c, with the use of a two-zoned catalyst system as depicted in FIG. 5a, approximately 50 ppm of NO is emitted. This two-zone catalyst system resulted in a gross $NO_x$ conversion of 95% and a net $NO_x$ conversion of 66%. The four-zone catalyst embodiment, depicted as FIG. 5b, significantly reduced $NO_x$ emissions, well below the 15 ppm range, to result in gross $NO_x$ conversion of 99% and a net $NO_x$ conversion of 86%. Finally, as illustrated by the eight zoned catalyst embodiment, FIG. 5c, gross $NO_x$ conversion is 100% and net $NO_x$ conversion is 97.5%. The improvement comes from the reduction of $N_2O$, elimination of the $NH_3$ breakthrough and reduction of $NO_x$. Accordingly, as the catalyst system is zoned down from 1" sections to ¼" sections, the test results revealed an associated improvement in net $NO_x$ conversion.

As shown in FIGS. 5a-5c, a zoned catalyst, with alternating lean $NO_x$ and $NH_3$—SCR catalysts in 1" to ¼" sections significantly improves the net $NO_x$ conversion from 66% to 97.5%. In addition, the gross $NO_x$ conversion is improved from 95% to 100%. In general, the improvement in the net $NO_x$ conversion is the function of the elimination of the ammonia slip, reduction in $N_2O$, and extra $NO_x$ reduction related to the $NH_3+NO_x$ reaction on the $NH_3$—SCR catalyst. It is further believed that the drop in $N_2O$ emissions is likely due to a higher fraction of the $NO_x$ reduction reaction proceeding on the $NH_3$—SCR catalyst rather than the lean $NO_x$ trap. $NO_x$ reduction over a platinum-containing-lean $NO_x$ trap results in high levels of $N_2O$ generation, whereas the $NH_3$—SCR catalyst has a high selectivity to nitrogen.

Figure 6A:
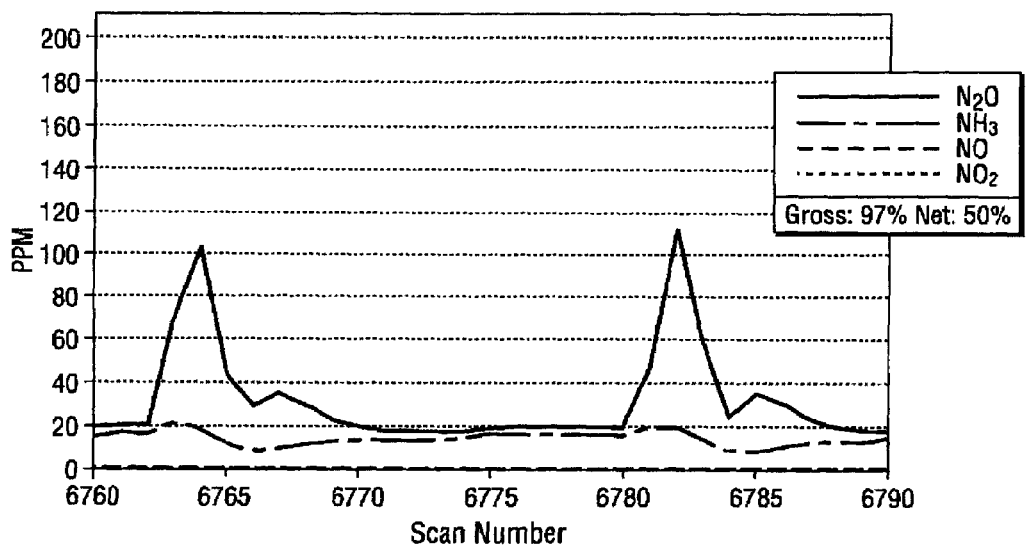
FIGS. 6a, 6b and 6c provide graphs illustrating the reduced levels of $NO_x$ and $NH_3$ emissions resulting from each of the three zoned catalyst embodiments depicted in FIGS. 4a, 4b and 4c at a 200° C. inlet gas temperature and operating at a 25 second lean cycle and a 5 second rich cycle.
Figure 6A:
Figure 6B:
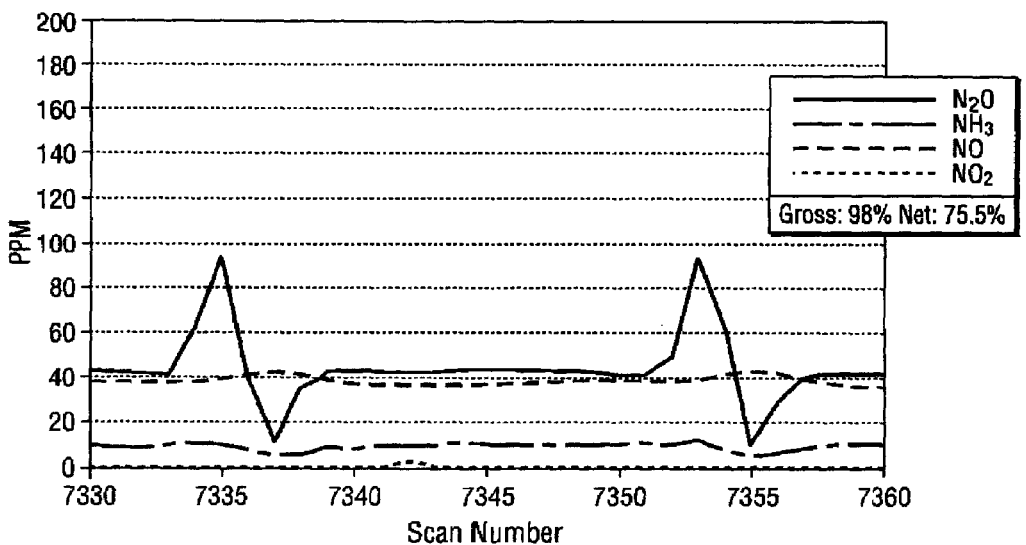
Figure 6B:
Figure 6C:
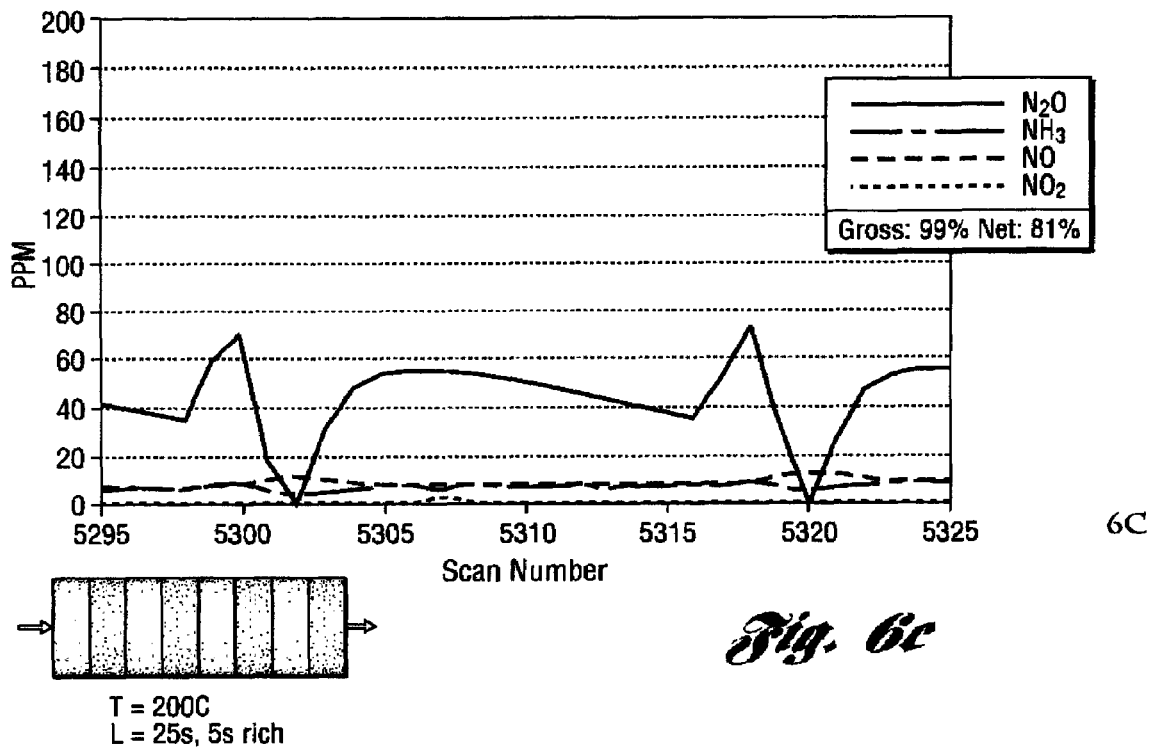

FIGS. 6a-6c depicts laboratory data obtained using the three-zoned catalyst embodiments originally shown in FIGS. 4a-4c at a 200° C. inlet gas temperature operating with a 25 second lean cycle and a 5 second rich cycle. As compared to FIGS. 5a-5c, it should be noted that shortening the lean time from 50 seconds, as used in FIGS. 5a-5c, to 25 seconds, resulted in a substantial higher steady emission of ammonia—a fact which results in reduced net $NO_x$ conversion rates, as compared to the data charted in FIGS. 5a-5c. As can be seen in FIGS. 6a-6c, the use of smaller zoned sections from two zones to eight zones, and thus 1" sections down to ¼" sections, as illustrated in FIGS. 6a and 6c, improves the net $NO_x$ conversion from 50% to 81%. Again, this improvement is believed to come mainly from the reduction of ammonia breakthrough and a small reduction in $N_2O$ emissions. This lab data was obtained with an inlet concentration of the $NO_x$ feed gas at 500 ppm and an overall space velocity at 15,000 per hour.

As set forth above, in the preferred embodiment, the lean $NO_x$ trap washcoat and $NH_3$—SCR washcoat are combined in a single substrate rather than placing the $NH_3$—SCR formulation downstream of the lean $NO_x$ adsorber as two separate catalyst substrates. Under this embodiment, the catalyst formulations can be incorporated together by mixing or layering the washcoats on a substrate.

Figure 7A:
FIGS. 7a, 7b and 7c show three proposed examples of washcoat configurations incorporating the lean $NO_x$ trap and $NH_3$—SCR formulations into the same substrate.
Figure 7A:
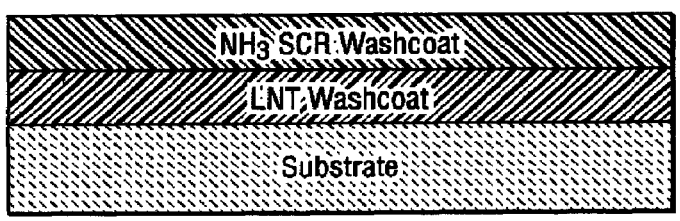
Figure 7B:
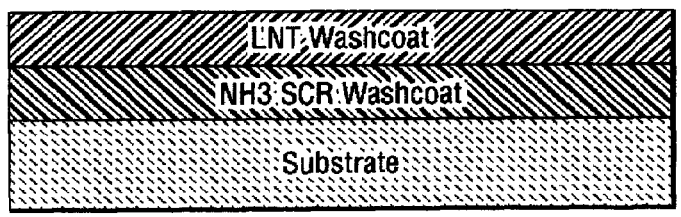
Figure 7C:
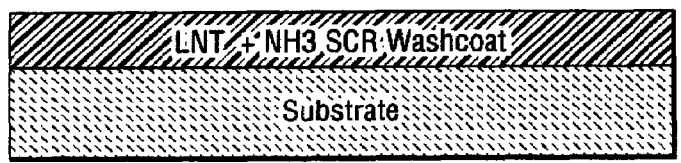

FIGS. 7a-7c show three proposed washcoat configurations incorporating the lean $NO_x$ trap and $NH_3$—SCR formulations into the same substrate. As shown in FIGS. 7a and 7b, the first and second proposed configurations have the lean $NO_x$ trap and $NH_3$—SCR washcoat formulations on the bottom and top layer, respectively. It is believed that the top layer could be a highly porous structure that allows better and faster contact between the chemicals and gas phase and the active sites in the second layer. The third configuration, as shown in FIG. 7c, involves the use of a one layer washcoat containing both lean $NO_x$ trap and $NH_3$—SCR washcoat formulations. Under this third configuration, shown in FIG. 7c, the washcoat composition of the lean $NO_x$ trap and $NH_3$—SCR catalyst could be homogeneously or heterogeneously mixed. For a heterogeneously mixed composition, the formulation of the lean $NO_x$ trap and $NH_3$—SCR catalyst are separated. However, they contact each other in varying degrees by controlling the size of the grain structures. The homogeneously mixed composition allows for a more intimate contact between the two formulations and is thus preferred.

The invention also contemplates engineering such combinations within the pores of the monolithic substrate. An example of this is incorporating washcoat into porous substrates used for filtering diesel particulate matter. Thus, this lean $NO_x$ trap/$NH_3$—SCR catalyst concept can be integrated into diesel particulate matter devices.

This very active SCR reaction of $NO_x$ and ammonia proceeds with or without oxygen present. Koebel et al. reports that the fastest SCR reaction involves equal molar amounts of NO and $NO_2$. NO and $NO_2$ then react with two $NH_3$ to yield $N_2$ in the absence of oxygen. In contrast, the lean $NO_x$ adsorber reaction of $NO_x$ plus CO is highly reactive only in an oxygen-free environment. In a lean $NO_x$ adsorber system, $NO_x$ is adsorbed during the lean cycle duration, $NO_x$ is not reduced. Accordingly, $NO_x$ reduction is limited to only the rich pulse time duration. On the other hand, the lean $NO_x$ adsorber+$NH_3$—SCR catalyst system allows for $NO_x$ reduction reaction to proceed during both the lean and rich time durations. Accordingly, ammonia as a reductant can be considered as a much more robust reductant than carbon monoxide.

Figure 8:
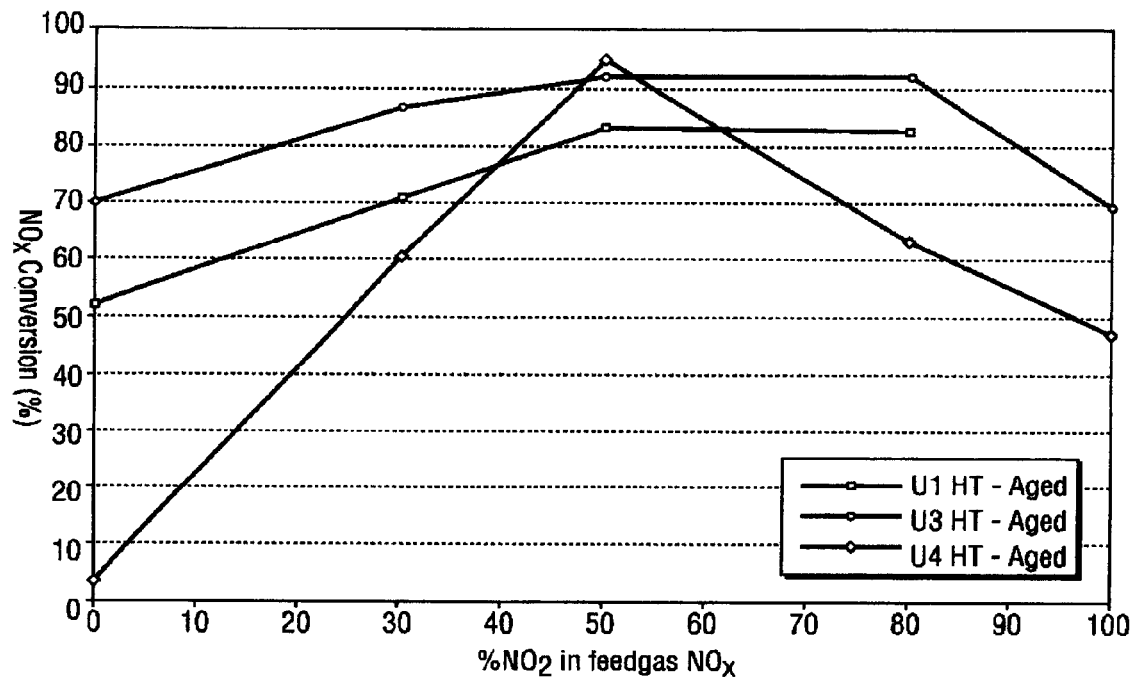
FIG. 8 is a graph illustrating the impact of $NO_x$ conversion after hydrothermal aging.

As set forth above, the fastest SCR reaction involves equal molar amounts of NO and $NO_2$. Accordingly, FIG. 8 illustrates the impact of varying NO:$NO_2$ ratios after hydrothermal aging. FIG. 8 is a graph of three $NH_3$—SCR catalyst formulations over a wide NO:$NO_2$ range. In the laboratory, it was possible to control the NO:$NO_2$ ratio entering the downstream $NH_3$—SCR catalyst. Accordingly, the NO:$NO_2$ ratio entering the $NH_3$—SCR catalyst was solely dependent on the upstream lean $NO_x$ adsorber. In some cases, the majority of the feed $NO_x$ (especially $NO_x$ spikes) are made up of mostly NO rather than $NO_2$. Accordingly, it is believed that the catalyst formulations of this invention will enhance reported net $NO_x$ efficiency—and thus the preferred catalyst is one that is capable of operating across the broadest range of NO:$NO_2$ ratios, and at a full spectrum of temperature ranges.

In general, since $NH_3$—SCR catalysts do not contain precious metals, they are significantly less costly than a typical lean $NO_x$ trap. Accordingly, it is more cost effective to have an overall catalyst system containing a lean $NO_x$ trap adsorber and an $NH_3$—SCR catalyst system, rather than one that uses two lean $NO_x$ trap adsorbers. Additionally, the incorporation of both a lean $NO_x$ trap and $NH_3$—SCR washcoat into a single substrate will significantly reduce substrate costs.

In another embodiment of this invention, $NH_3$ and $NO_x$ in an exhaust stream are reduced using a stoichiometric three-way catalyst system. This three-way catalyst system has particular application for high speed/high flow rate conditions (i.e., UOS6 conditions). Currently, three three-way catalysts are used for such high speed condition applications, wherein the third three-way catalyst is primarily directed to $NO_x$ removal for high speed/high flow rate conditions. Under this alternate embodiment, the third three-way catalyst can be substituted with an $NH_3$—SCR catalyst to store $NH_3$ for reaction with $NO_x$ to improve net $NO_x$ conversion, eliminate $NH_3$ emissions and reduce catalyst costs.

To improve net $NO_x$ and $NH_3$ reduction, the second three-way catalyst can be modified to enhance the three-way catalyst's ability to generate $NH_3$ emissions. To this end, in a preferred embodiment, the three-way catalyst is designed to generate desirable $NH_3$ creation by using platinum as the precious metal of the three-way catalyst, by placing platinum on the outer layer of the three-way catalyst to maximize the $NO+H_2 \rightarrow NH_3$ reaction. Likewise, the oxygen storage capacity (OSC) of the three-way catalyst can be removed to further promote the creation of "desirable" $NH_3$. By doing so, the $NH_3$ purposely generated during rich operation can then be stored by the $NH_3$—SCR catalyst for subsequent reaction with $NO_x$ emissions, and thereby control both $NO_x$ and $NH_3$ emissions under all operating conditions.

When a car is operated under rich conditions, the air/fuel ratio is less than 14.6, hydrogen is produced in the exhaust via the water-gas shift reaction: $CO+H_2O \rightarrow CO_2+H_2$. The hydrogen that is produced then reacts with $NO_x$ as it passes over the precious metal surface to create "desirable" ammonia. The ammonia produced is then stored on an $NH_3$—SCR catalyst to help reduce net $NO_x$ conversion. The reaction of $NO_x + NH_3 \rightarrow N_2 + H_2O$ can then take place on a separate $NH_3$ selective catalyst, capable of converting $NO_2$ and NO to $N_2$.

Figure 9:
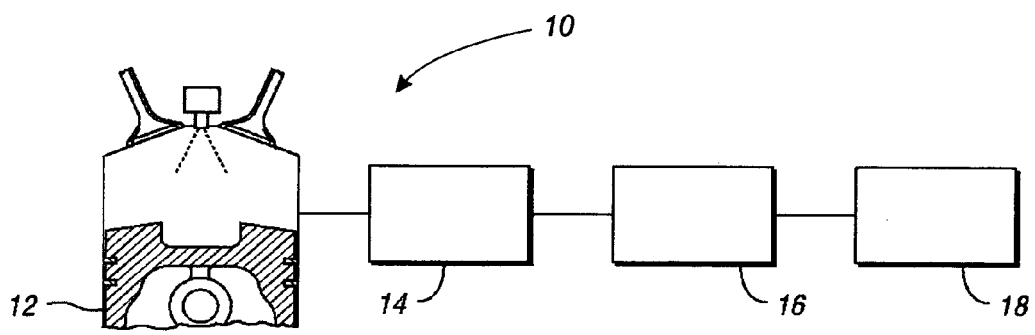
FIG. 9 depicts a modified three-way catalyst and $NH_3$—SCR catalyst system of the present invention.

As shown in FIG. 9, a stoichiometric three-way catalyst/$NH_3$—SCR catalyst system 10 is depicted, including a first three-way catalyst 14 positioned in close proximity to the engine 12 to reduce cold start emissions. The second three-way catalyst 16 is modified as described above to enhance the ability of the second three-way catalyst 16 to generate $NH_3$ emissions. Downstream of the second three-way catalyst 16 is an $NH_3$—SCR catalyst 18 that functions to store $NH_3$ produced by the modified second three-way catalyst 16 for reaction with $NO_x$ emissions, to reduce both $NO_x$ and $NH_3$ emissions.

By substituting the third three-way catalyst as currently used with an $NH_3$—SCR catalyst and thereby eliminating the need for a third precious metal containing catalyst, significant cost savings can be achieved.

It should further be noted that this invention also contemplates the use of a three-way catalyst, in combination with a lean $NO_x$ trap and an $NH_3$—SCR catalyst.

While the best mode for carrying out the invention has been described in detail, those familiar with the art to which this invention relates will recognize various alternative designs and embodiments for practicing the invention as defined by the following claims.

What is claimed:

1. A method of purifying exhaust gas of an internal combustion engine, the method comprising:
    generating ammonia in an exhaust system of said engine by a reaction of $NO_x$ and reducing components in exhaust gases when the exhaust gases are in a reducing state; and
    removing $NO_x$ downstream of the generated ammonia by adsorbing $NO_x$ in the exhaust gases when the exhaust gases are in an oxidizing state, and reducing the adsorbed $NO_x$ to generate ammonia and retaining the generated ammonia when the exhaust gases are in the reducing state.

2. An exhaust gas purifying apparatus for an internal combustion engine, comprising:
    ammonia generating device, provided in an exhaust system of said engine, for generating ammonia by a reaction of $NO_x$ and reducing components in exhaust gases when the exhaust gases are in a reducing state; and
    $NO_x$ removing device, provided downstream of said ammonia-generating device, for adsorbing $NO_x$ in the exhaust gases when the exhaust gases are in an oxidizing state, said $NO_x$ removing device reducing the adsorbed $NO_x$ to generate ammonia and retaining the generated ammonia when the exhaust gases are in the reducing state.

* * * * *